(No Model.)
R. B. LEE.
DEVICE FOR FORMING LATTICE PILLARS.
No. 265,106. Patented Sept. 26, 1882.
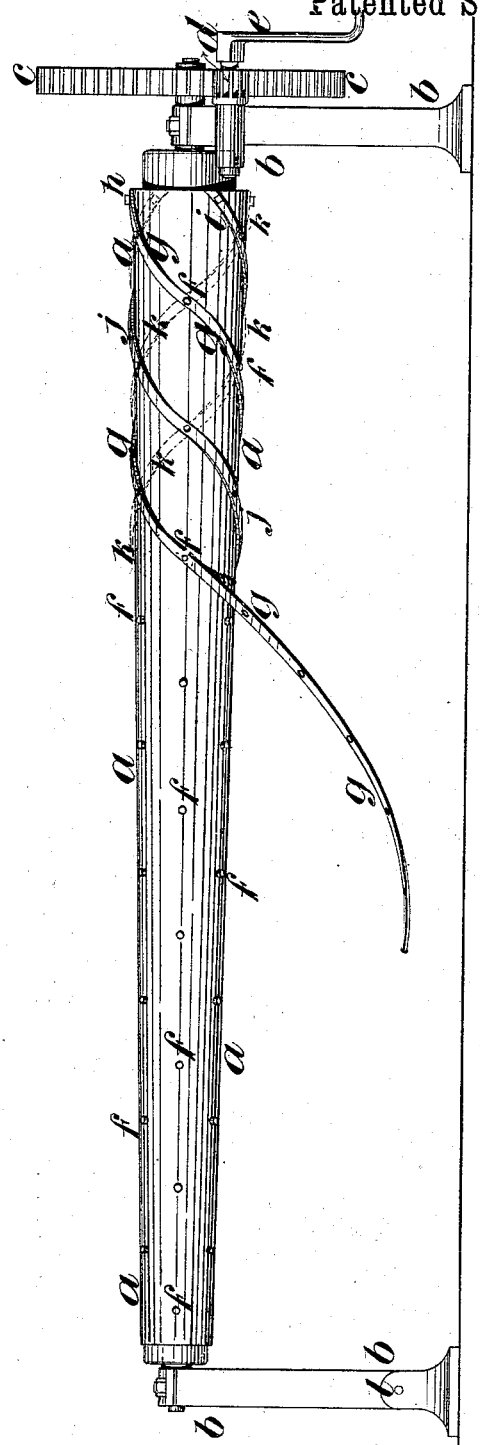
Witnesses
James F. Jobin
Harry Smith
Inventor
Robert B Lee
by his Attorneys
Howson & Son

UNITED STATES PATENT OFFICE.

ROBERT BRISTOW LEE, OF MANCHESTER, COUNTY OF LANCASTER, ASSIGNOR TO JAMES HODGSON, OF ULVERSTONE, ENGLAND.

DEVICE FOR FORMING LATTICE-PILLARS.

SPECIFICATION forming part of Letters Patent No. 265,106, dated September 26, 1882.

Application filed July 26, 1882. (No model.) Patented in England October 25, 1881, No. 4,670.

*To all whom it may concern:*

Be it known that I, ROBERT BRISTOW LEE, a subject of the Queen of Great Britain and Ireland, and residing at Manchester, county of Lancaster, England, have invented certain Improvements in the Method of and Apparatus for Making Metallic Pillars, Posts, and Columns for Telegraphic and other Purposes, (for which I have obtained a patent in Great Britain, No. 4,670, October 25, 1881,) of which the following is a specification.

The object of this invention is to facilitate the economical production of poles, columns, and standards used for telegraphic and other purposes. In producing these columns I employ flat, channel, angle, or other shaped steel or iron, and coil it spirally upon a mandrel supported upon standards in suitable bearings, and provided with pins at the places where the coils are to intersect. The bar is punched or drilled at the calculated points of intersection, and the end of the bar is fixed to one end of the mandrel. The mandrel is then rotated and the operator guides the bar or ribbon so as to coil it spirally upon the mandrel to the pitch indicated by the pins, which are allowed to enter the holes in the bar. The spirals are coiled right and left so as to intersect each other.

In the annexed drawing, $a$ is the said mandrel, which is provided with axles or gudgeons, which are mounted to revolve in suitable bearings formed in the standards $b\ b$. Upon one of the said axles is fixed a spur-wheel, $c$, with which gears a pinion, $d$, which is fixed upon a short shaft, which is provided with a winch-handle, $e$, whereby the mandrel may be caused to revolve. Any other suitable means may be employed for actuating the mandrel. The mandrel is made of a conical or tapering form, the amount of taper being varied according to the requirements; but in all cases I prefer to have some amount of taper, in order that the coiled bar may be readily slipped off the mandrel. The mandrel is provided with pins $f\ f$, which are screwed into tapped holes formed in the shell of the mandrel, which usually consists of a hollow casting. Each pin is so situated as that the right and left hand coils of bars can intersect over it to form the required pattern of post. The end of a bar, $g$, which has been punched with holes at the required distances apart, is secured by means of a screw, $h$, to the mandrel, which is then caused to rotate. The operator grasps the bar with his hands and guides it so that it becomes coiled upon the mandrel, the pins acting as guides to the operator. As the coil is formed the pins take into the holes in the bar and prevent the slipping of the bar or any change in form. When the bar is coiled from one end of the mandrel to the other the end of the bar is secured and other bars are coiled to form intermediate spirals, which are indicated by $i$ and $j$. The direction of rotation of the mandrel is then reversed and the other bars are coiled in the reverse direction, as indicated by the dotted lines at $k$, so as to cross or intersect the first coils at the pins, which also take into the bars which form these cross-coils. When all the coils are completed the coils are temporarily secured together by means of bolts and the pins $f$ are removed, or are screwed home so as to clear the bars, and the screws $h$ are withdrawn. The temporarily-connected coils can now be drawn off the mandrel. To enable this to be done the axle at the smaller end is withdrawn from the bearing, or the standard is turned out of the way, for which purpose it may be hinged, as indicated at $l$. The coils are now riveted together at the points of intersection. In the construction of a high or long tapering column taper mandrels of different diameters are used in the construction of sectional lengths, and the lengths so produced are bolted or riveted together to form the complete column. To strengthen the column I fix in the interior of the coils channel, angle, or T iron or steel uprights, which are bolted or secured to the spirals at the points of intersection. To provide for the attachment to each other of the sections of a column, I prefer to roll or form each of the uprights with an enlargement at one end, so that the ends of the uprights which are left projecting from one end of a section may enter the said enlargements on the ends of the uprights in another section, and be riveted, bolted, or secured thereto.

I claim as my invention—

1. A rotary mandrel provided with pins $f$, set in its periphery in a series of spirals.

2. A tapering mandrel provided with pins $f$, set in its periphery, substantially as and for the purpose set forth.

3. The combination of the tapering mandrel having pins in its periphery with supporting-standards, one of which is movable, substantially as specified.

4. The combination of the mandrel having pins in its periphery with standards, gearing, and operating-handle, as described.

In testimony whereof I have signed my name to this specification in the presence of two subscribing witnesses.

ROBT. BRISTOW LEE.

Witnesses:
 EDWARD K. DUTTON,
 DAVID FULTON.